Feb. 1, 1966  A. NORWICH  3,232,429
FILL LEVEL DETECTOR
Filed May 31, 1963  4 Sheets-Sheet 1
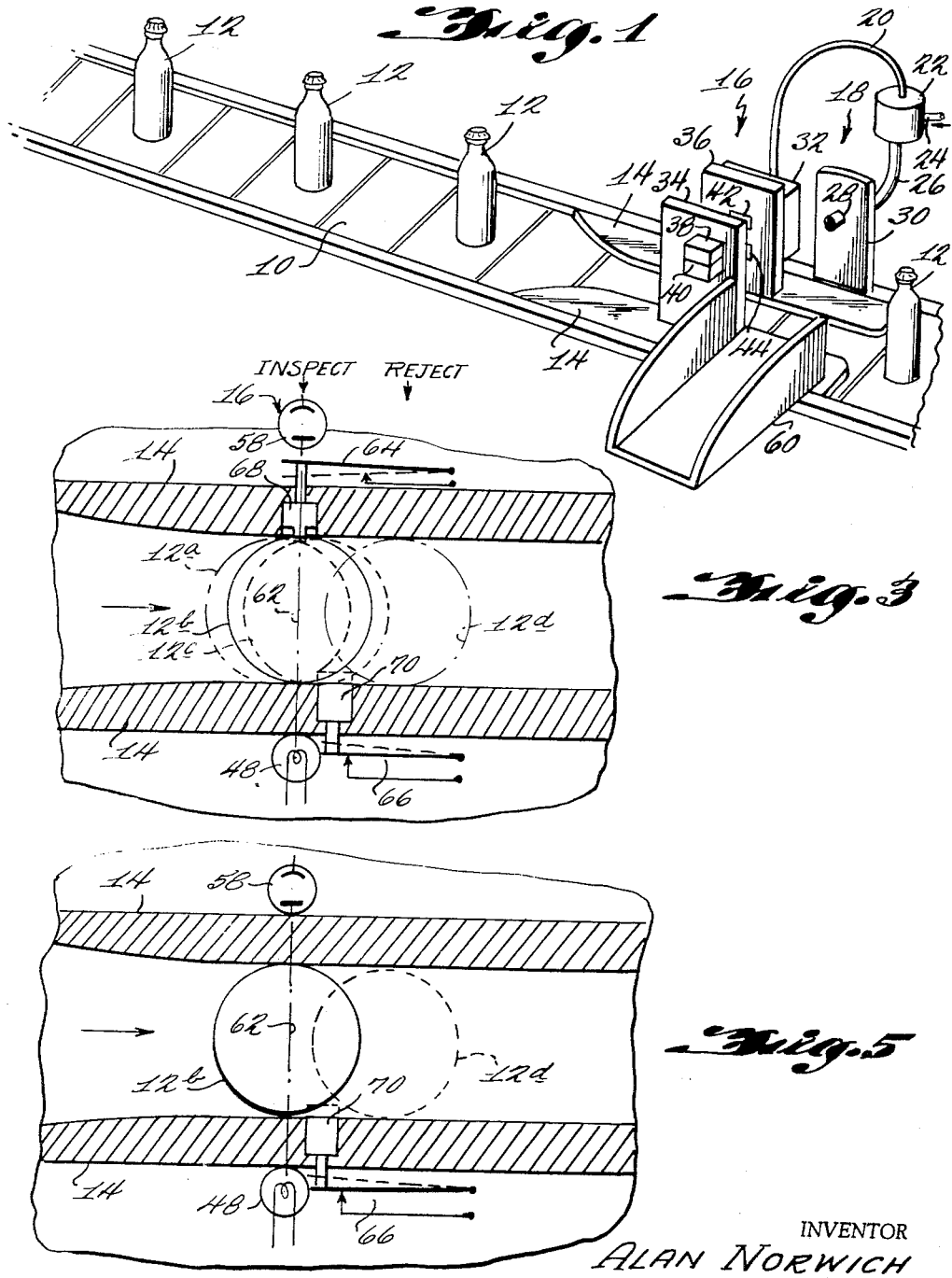
INVENTOR
ALAN NORWICH
BY Cushman, Darby & Cushman
ATTORNEYS

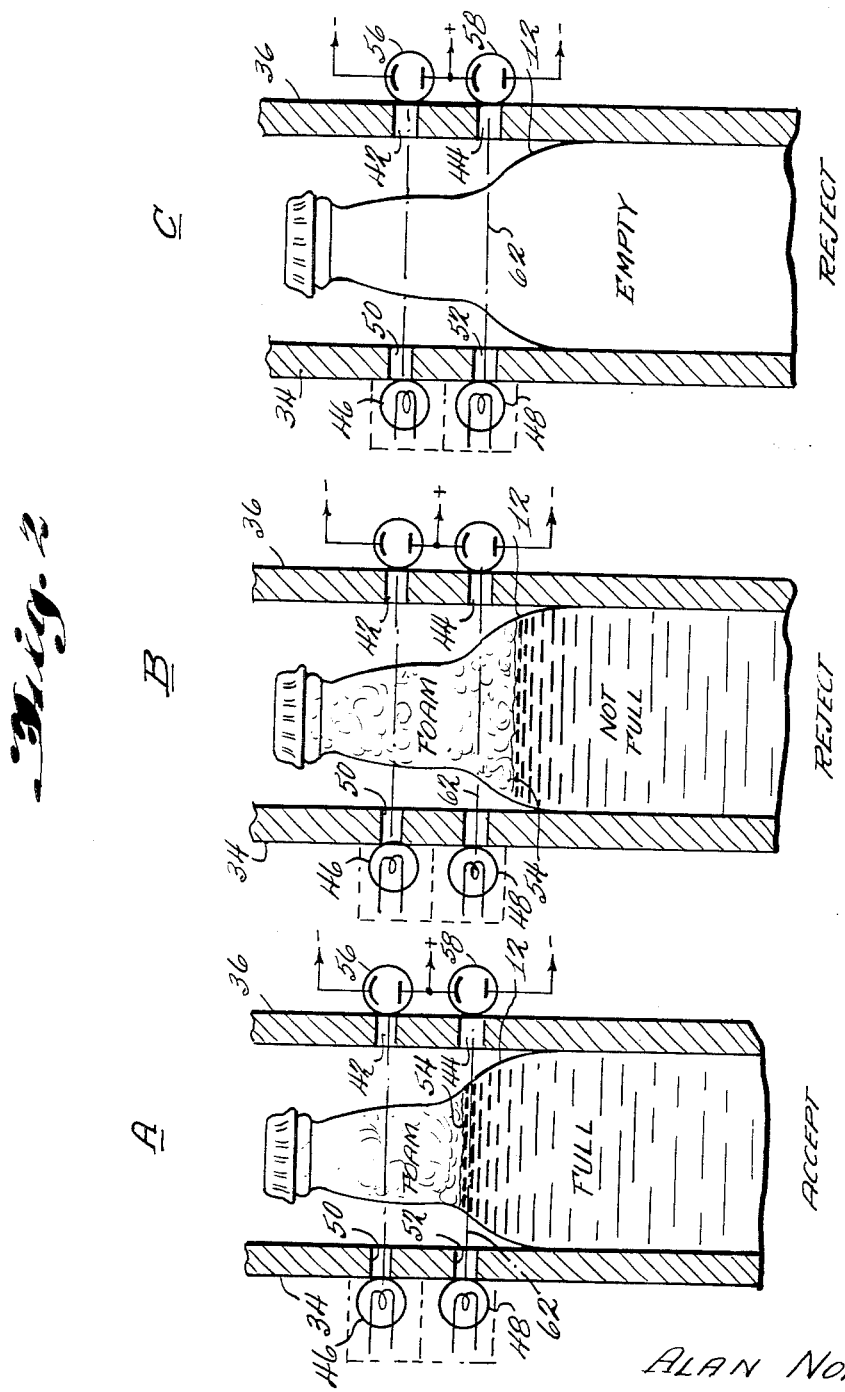

Feb. 1, 1966 — A. NORWICH — 3,232,429
FILL LEVEL DETECTOR
Filed May 31, 1963 — 4 Sheets-Sheet 3

INVENTOR
ALAN NORWICH

BY Cushman, Darby & Cushman

Feb. 1, 1966

A. NORWICH 3,232,429

FILL LEVEL DETECTOR

Filed May 31, 1963

INVENTOR
ALAN NORWICH

BY Cushman, Darby & Cushman

United States Patent Office 3,232,429
Patented Feb. 1, 1966

3,232,429
FILL LEVEL DETECTOR
Alan Norwich, Columbus, Ohio, assignor to Industrial Nucleonics Corporation, a corporation of Ohio
Filed May 31, 1963, Ser. No. 284,402
24 Claims. (Cl. 209—111.7)

This invention relates to classifying apparatus and particularly to circuitry for operating an identifying device, such as a rejector, as a latter time in response to a given signal derived earlier at an inspection station if a given characteristic of a movable article being therein inspected is present. In other words, this invention relates to electronic apparatus for classifying production items traveling along an inspection line, and more specifically improve means for detecting the presence of a given, usually undesirable, characteristic, such as a deficiency, in a passing item and to means for automatically identifying or rejecting items having such a characteristic.

The invention is herein illustrated and described in connection with a fill-level gauge or measuring device and rejection apparatus for under-filled bottles. However, it will be readily apparent that the invention is usable in many other industrial applications where a comparison is made to determine whether two radiant energy beams are respectively passing through an item or items being checked.

The specific example with which this specification deals is related to detecting whether or not a container such as a bottle, which has recently been filled and capped contains a sufficient amount of liquid such as beer or any other liquid which has the inherent characteristics of causing foam or the like through which passage of radiant energy such as light is prevented.

The invention is particularly well adapted to measuring the fill level of beer after bottling and prior to its being pasteurized, because there is then a relatively large amount of foam present above the beel level. This fact rules out most of the methods of level measurement, which are satisfactory when no foam is present. It has been observed that there is correlation between level of the beer directly after bottling when a considerable amount of foam is present, and the final level attained when the foam has settled, and accordingly an initial determination of whether beer-foam interface is above or below a given level is sufficient to gauge the final head of beer.

Although the classifying apparatus described and claimed in by Patent 2,999,589, which operates by a capacitance method to detect whether the fill-level is sufficient, is highly satisfactory in every case when little or no foam is present, it has been found that the level of beer or other liquid which causes foam, especially excessive foam, is more difficult to detect by capacitance measuring methods because the foam has almost as much effect on the capacitance measuring device as the beer itself. This effect was quite noticeable at low frequencies, and even up to 100 kc. there was little or no discrimination between beer and foam, though the effect was lessened in some degree when the operating frequency was raised to 100 mc., or higher. Even then, however, the apparent beer level may depend on foam density as well as the actual level of beer, and consequently an insufficient improvement was there present to allow accurate measurement of the beer level at all times.

It is accordingly an object of this invention to provide improved apparatus for allowing a container fill-level to be inspected accurately even when the container is filled with a liquid of the type which can generate a substantial head of foam or the like.

It is a further object of this invention to effect a detection of foam and liquid by use of radiant energy sources operating into a balanceable bridge circuit the output of which is applied to a memory circuit or the like during a predetermined length of container passage past the energy sources, with the memory being connected to rejecting means which are operated, if at all, only when the container being inspected sufficiently proceeds down the line to a rejection station.

Other objects, features, and advantages of this invention will become fully apparent to those of ordinary skill in the art upon the reading of the following detailed description and appended claims in conjunction with the attached drawings in which:

FIGURE 1 is a perspective showing of an inspection line having the improved means of this invention for automatically rejecting under-filled bottles;

FIGURES 2A, 2B, and 2C respectively illustrate the relationship of the radiant energy sources and detectors relative to a sufficiently full bottle and to bottles not sufficiently full;

FIGURE 3 is a diagrammatic plan view indicating the horizontal relationship of a progressing bottle, radiant energy sources and detectors, as well as timing switches;

Figure 4:
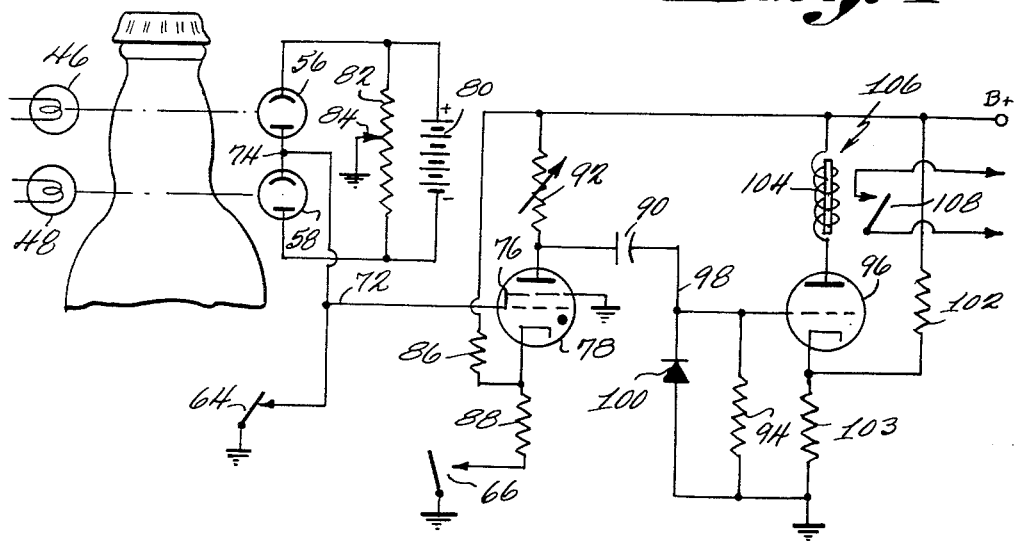
FIGURE 4 illustrates a first embodiment of circuitry with which may be used the switching arrangement indicated in FIGURE 3.
Figure 6:
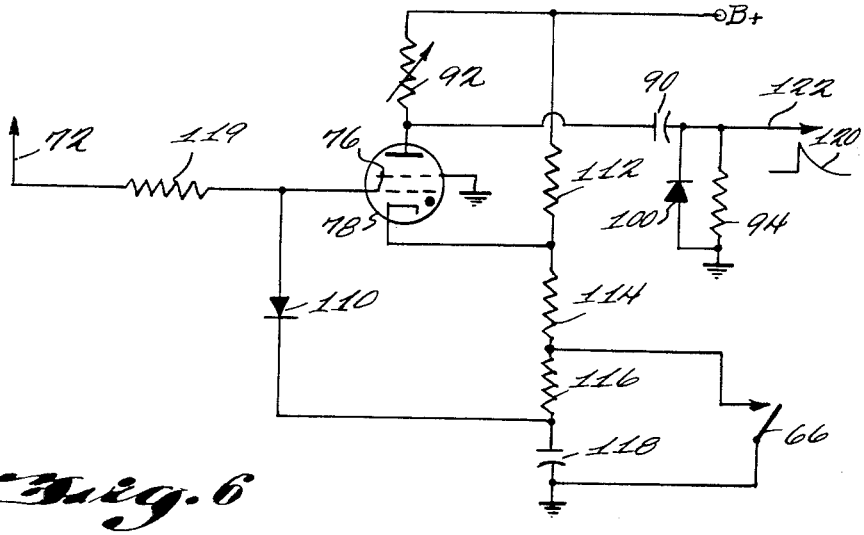
Figure 7:
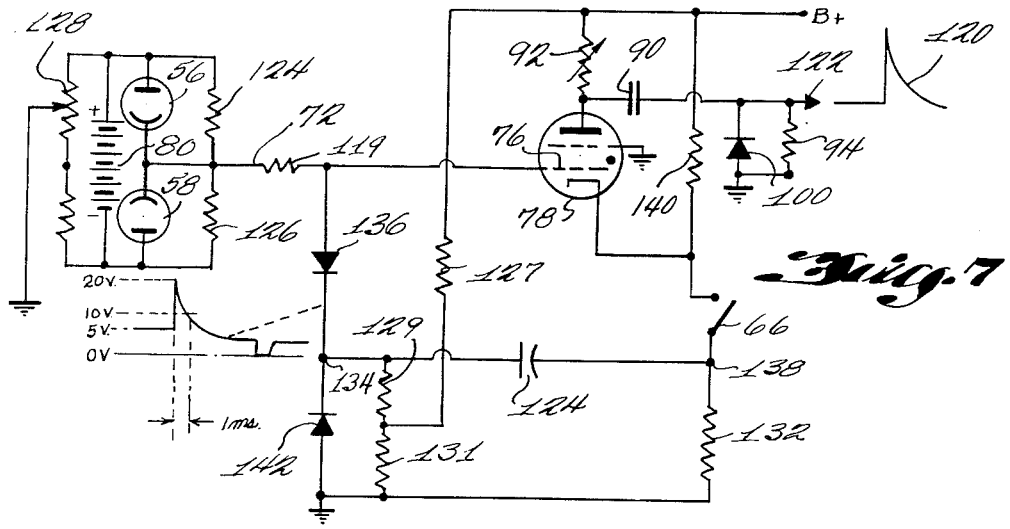
Figure 8:
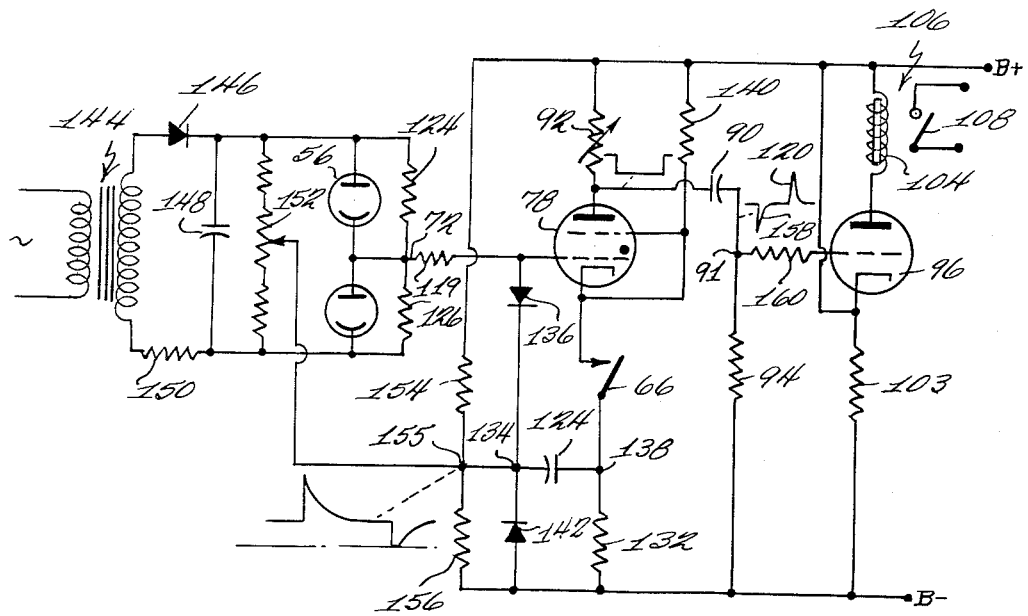

FIGURE 5 diagrammatically illustrates another embodiment of bottle guide and switch means, which is particularly useful with the circuits of FIGURES 6–8;

FIGURE 6 illustrates a modification of the circuitry of FIGURE 4 for use with the single switch embodiment of FIGURE 5;

FIGURE 7 illustrates a still further embodiment of the circuitry of this invention; and FIGURE 8 illustrates another and preferred embodiment of the circuitry according to this invention.

In FIGURE 1, there is shown a traveling conveyor 10 bearing a plurality of previously filled and capped glass bottles 12, which are on their way to a pasteurizing station, for example. Enroute they are guided by side rail attachements 14 into an inspection station 16 from whence they pass through a rejection station 18. Inspection station 16 determines whether or not a given characteristic, such as a fill-level deficiency, is present in each supposedly-filled bottle 12 passing therethrough. If it is, an electrical circuit signal is provided on output lines 20 to the identifying device or rejecting apparatus 18. This signal energizes an electrical solenoid valve 22, to cause air to enter therein from conduit 24 and out via conduit 26 through a jet 28 supported in the upstanding member 30 which is appropriately secured at or to the side of the conveyor. Normally, valve 22 is held closed in any suitable manner until a given signal is applied to it over line 20 from the box 32, which contains the gauge circuitry described below.

As a bottle passes through inspection station 16, it passes between the upstanding blocks 34 and 36. On the outerside of block 34 are two boxes 38 and 40, which respectively contain radiant energy sources, such as sources of light, the energy beams of which are directed, preferably by appropriate apertures in block 34, across the conveyor line in a level, narrow manner to receiving apertures 42 and 44 in block 36.

With reference to FIGURE 2A, it will be apparent that the incandescent light sources 46 and 48, that are respectively in boxes 38 and 40 of FIGURE 1, are positioned vertically of each other so as to be beamed toward the aforementioned respective apertures 42 and 44 in an attempt to penetrate bottle 12 and its contents. The liquid-foam interface 54 of the properly filled bottle 12 in FIGURE 2A is above only the lower energy beam 62.

This interface is normally very well defined, and it has been determined that the radiant energy from light source 46 when it encounters foam, will be transmitted negligibly, if at all, through the foam to aperture 42 and the radiant energy detector or photocell 56. This is caused, as far as understood, by the curvature of the surfaces of the individual bubbles in the foam diffusing the light rather than passing it through to the photocell. On the other hand the liquid below interface 54 in FIGURE 2A seems to actually focus the light energy from source 48 through aperture 44 onto the detector or photocell 58 thus improving the transmission of the light.

As is apparent below, photocells 56 and 58 are connected in a bridge circuit and to further circuitry with the arrangement being such that under the circumstances indicated in FIGURE 2A, the solenoid valve 22 of FIGURE 1 is not electrically actuated, and accordingly a properly filled bottle passing from the inspection station 16 can pass through the rejection station 18 without being ejected from the traveling conveyor onto the chute 60.

However, when the liquid-foam interface 54 of FIGURE 2A is below the lower radiant energy line 62 as shown in FIGURE 2B, or when the bottle is empty as indicated in FIGURE 2C, the circuitry associated with photocells 56 and 58 causes a signal to be transmitted over line 20 in FIGURE 1, when the insufficiently filled bottle arrives at the rejection station 18, to cause energization of solenoid valve 22, allowing a blast of compressed air to issue from jet 28, thereby tilting the under-filled bottle off the conveyor and onto the chute 60 whereby it may slide down into a suitable receiver.

In the first embodiment to be described, it will be noted in FIGURE 3 that use is made of two separate position-sensing switches 64 and 66, which are respectively operated by plungers or actuators 68 and 70. These actuators may be disposed in the bottle guides 14, or in the respective upstanding blocks 34 and 36 as desired. In any event, the diagrammatic description of FIGURE 3 shows a bottle in successive positions 12a, 12b, 12c and 12d. At position 12a, the bottle is partially in the inspection station 16, and at this point engages switch actuator 68 to cause it to move outwardly and immediately open the normally closed switch 64, which starts the inspection period. During the inspection period, the bottle encounters switch actuator 70 and closes the normally open switch 66. The reason for this sequence of operation of these switches 64 and 66 will become apparent from the below description of the circuitry in FIGURE 4, but for the present time it is sufficient to indicate that the closure of switch 66 allows the memory circuit to respond to signals from the photocell circuitry due to radiant energy detection when switch 64 is open and the photocell input to the memory is unclamped.

As will be apparent from FIGURE 3, at position 12b, the bottle is centered on the beam 62, but because actuator 68 keeps switch 64 open from bottle position 12a to 12c, approximately the central ¼ of the length of the bottle passes across the radiant energy beam 62 to allow inspection of the bottle during that time. The closing of switch 64 effectively turns off the inspection period but as will become apparent hereinafter, the inspection signal, generated in accordance with what both photocells see, is not allowed to have any effect until the bottle moves into the rejection station, i.e., at position 12d whereat actuator 70 is allowed to move inwardly a sufficient amount (to its dotted line position) to open switch 66.

The circuitry of FIGURE 4 is arranged to utilize the switching arrangement of FIGURE 3, it being noted in FIGURE 4 that switch 64 is normally closed while switch 66 is normally opened, as previously stated. Switch 64 has one of its terminals connected to ground and the other to line 72 which extends from the junction 74 between the anode of photocell 56 and cathode of photocell 58, to a control element of an actuator or memory such as to grid 76 of a thyratron tube 78.

Photocells 56 and 58 are serially connected, as indicated, across a suitable voltage source, such as battery 80, and across the opposite ends of a potentiometer 82 the movable connection arm 84 of which is grounded. The photocells are therefore in adjacent legs of a bridge circuit the other two legs of which are the portions of potentiometer 82 divided by arm 84. Preferably, arm 84 of the potentiometer is set so that the output of the bridge on line 72, when switch 64 is open, is negative when only the lower photocell 58 is receiving energy from source 48, but will be positive when both photocells are so illuminated because of an empty bottle or when both are dark and not illuminated because both the light sources are blocked by foam due to the liquid not being at a high enough level. Since the photocells are connected in a bridge circuit, temperature variations in the photocells themselves will tend to compensate as will changes in ambient light or in light source intensity. A very large positive signal is normally present when the level is below the minimum, since the resistance ratio between the dark and light condition of the cells is of the order of hundreds to one. Therefore, accurate balancing of the bridge is not important, it being only necessary to make sure that the potentiometer arm is set so that a large positive output is available during the rejection conditions indicated in FIGURES 2B and C. Preferably, in the embodiment of FIGURE 4, as well as in all of the other embodiments in this application, the photocells are selected to have good response to red light and infrared energy, as this part of the spectrum is least affected by the usual dark beer bottle color and the color of beer than white light. Accordingly, red filters are preferably used with the light sources when the invention is utilized with colored bottles and liquids of the type just indicated.

As indicated above, potentiometer arm 84 is set to unbalance the bridge when the photocell resistances are balanced, i.e., when both cells are receiving light from the respective sources 46 and 48, or when neither cell is receiving such light, so that a large positive output signal is available on line 72 while that line is unclamped (ungrounded) by switch 64 being open.

For two reasons, the level of liquid should be gauged by the system when a bottle is substantially centered on the light beams. One reason is because refraction and scattering of the light beams takes place when the beams are not at 90 degrees to the tangent of the curvature of the bottle. This effect is not particularly critical with regard to positioning of a bottle when it is generally located centrally of the light beams, but should be kept in mind. The other reason is that when no bottle is in the inspection station, i.e., intercepting neither of the light beams at all, the resistances of the photocells are balanced, which it will be recalled, provides for a large positive output signal on line 72. Therefore, if it were not for clamping that signal to ground by switch 64, it would be sufficient to trigger the memory tube 78, assuming cathode switch 66 were closed, which in the illustrated embodiment is the case just before and after switch 64 is operated. As will be apparent to those acquainted with thyratron operation, switch 66 need not close ahead of opening switch 64 to prepare the tube to fire, since in fact those switches may be operated simultaneously or switch 64 ahead of switch 66 as long as the former remains open until the latter closes. For convenience, the further description will assume switch 66 is closed before switch 64 is opened.

As will be recalled, switch 64 is not open except when approximately the central quarter of a bottle is intercepting the light beams. Further, just prior to this time, switch 66 is closed, thereby energizing thyratron 78, i.e., connecting it across a source of energy by completing its anode-cathode circuit, so that it can be fired when its grid 76 is raised above the cut-off cathode bias potential determined by the voltage divider comprising resistors 86 and 88. Therefore, when the signal on line 72 is negative while switch 64 is open, indicating that the inspected bottle has a sufficient amount of liquid in it, thyratron 78 will not fire, so its anode remains approximately at the B+ potential. This keeps condenser 90 charged accordingly, through a variable resistor 92 and a grid resistor 94 of vacuum tube 96.

However, when an under-filled bottle, or an empty one, is inspected, causing a resultant large positive signal on line 72, thyratron 78 fires and discharges condenser 90 to a voltage corresponding to the voltage drop across the thyratron 78 and resistor 88. This causes on line 98 a negative-going signal, which is clamped to ground by diode 100 and makes no change in the non-conducting status of tube 96. As soon as the inspection period is over, switch 64 recloses reducing the voltage on thyratron grid 76 to zero, but due to the characteristic of such a tube, the thyratron remains firing. However, as will be recalled, when the bottle finally moves to the rejection station, the other switch 66 opens, thereby breaking the anode-cathode circuit of the thyratron and causing it to stop conduction. This returns the anode voltage of the thyratron to the B+ potential, recharging condenser 90 toward that potential and causes a positive pulse to be applied to the grid of tube 96. Since this tube has its cathode at a potential determined by the voltage divider including resistors 102 and 103, which potential is less than the positive pulse applied to the tube grid, tube 96 conducts current. This energizes the coil 104 of relay 106 causing its switch contacts 108 to close. In turn, via an energy source not shown, this causes a signal on line 20 of FIGURE 1, thereby energizing the solenoid valve 22 and causing the deficiently filled bottle to be rejected by the jet of air issuing from jet 28. This jet of air has a duration which depends upon the value of condenser 90 and resistors 92 and 94 in FIGURE 4. As long as the recharging of condenser 90 causes a voltage on line 98 to exist at an amplitude large enough to overcome the cathode bias of tube 96, the rejection control relay 106 will stay operated. Variation in the valve of resistor 92 allows for appropriate setting of the length of time the ejector operates so as to be assured that a deficiently filled bottle is actually ejected.

Although switches 64 and 66 are shown in FIGURE 3 to be on opposite sides of the conveyor half, they can be actually on the same side, and can also be combined so as to be actuated by the same actuating plunger, it being then only desirable to be sure that switch 64 opens before switch 66 closes and vice versa. To prevent any necessity of synchronizing these separate or combined switches, the circuitry may be modified as indicated in FIGURES 6, 7 and 8 so that only a single switch 66 need be employed. The physical arrangement of this switch may be shown in FIGURE 5. Again, this switch is closed just before the bottle centers on the light beam at position 12b in the inspection or measuring station and remains closed until the bottle moves to the rejection station at position 12d.

The modification of the circuitry shown in FIGURE 6 utilizes a diode 110 as the input signal clamping means, instead of a switch as switch 64 in FIGURE 4. In this embodiment, the voltage divider which sets the thyratron cathode potential includes resistors 112, 114, 116 and condenser 118. While switch 66 is open, condenser 118 is charged to approximately the B+ potential. Therefore, the cathode potential of thyratron 78 is sufficiently high to prevent the normally large positive voltage that is present on line 72 when no bottle is in the inspection station, from firing the thyratron, even though the clamping diode 110 is at this time effectively turned off by the relatively high potential on its cathode.

Whenever a bottle arrives in the measuring station and closes switch 66 in FIGURE 6, the voltage across condenser 118 cannot drop to zero volts instantly, but it discharges gradually through resistor 116 and switch 66 so that diode 110 remains back-biased for a given period of time depending upon the discharge time constant of resistor 116 and condenser 118, for example for approximately one millisecond if these elements respectively have values of approximately 4700 ohms and 1 mfd. Any sufficiently positive signal on line 72 coupled by input resistor 119 to the grid 76 can cause thyratron 78 to fire during that period of time. After that, however, the cathode voltage of diode 110 reduces sufficiently to clamp grid 76 to a voltage sufficiently low to prevent firing of the thyratron if it has not already been fired. That is, if during the unclamped period, the voltage on line 72 is not more positive than the cathode voltage of diode 110, the thyratron 78 will not fire, and it cannot be fired after that period of time passes since diode 110 clamps the grid to a voltage too low for thyratron firing. Again, when the thyratron fires, condenser 90 is discharged and the resultant negative-going pulse is clamped to ground by diode 100. Whenever the inspected bottle is then removed to the rejection station so that switch 66 is reopened, thyratron 78 ceases to fire, thereby causing condenser 90 to be recharged and providing a positive reject pulse 20 on output line 122, which may connect to a vacuum tube such as 96 in FIGURE 4.

A still further improvement in the circuitry of this invention is illustrated in FIGURE 7. Again, only a single switch 66 is employed, and it is operated as indicated in FIGURE 5. In FIGURE 7, the bridge circuitry is shown to include resistor 124 and 126 serially connected together across the photocells 56 and 58, with the junction of these resistors being connected to the junction of the photocells and to line 72. The desired unbalance of the bridge is effected by operation of the arm of potentiometer 128. The bridge output voltage is coupled via line 72 and input resistor 119 to the grid of thyratron 78, as previously.

While switch 66 is open in FIGURE 7, condenser 124 is charged by a B+ potential, of 150 volts for example, via resistor 127 and the upper part of the potential divider which includes resistors 129 and 131, in conjunction with resistor 132, so as to effect about 5 volts, for example, across the condenser 124. Therefore, junction 134 is then at about 5 volts positive, and therefore grid 76 of the thyratron tube is prevented from moving more than 5 volts positive because diode 136 clamps the grid to that voltage. When switch 66 closes due to a bottle being moved to the inspection station, the voltage at junction 138 rises sharply to +15 volts. This pulse is transferred via condenser 124 to junction 134 so as to raise the voltage to +20 volts. This allows the thyratron grid to receive any positive signal on line 20 which is up to 20 volts positive relative to ground. Such a voltage is higher than the thyratron 15 volts cathode bias set by the potential divider including resistors 132 and 140, so thyratron 78 fires. After approximately one millisecond, or whatever discharge time constant is associated with condenser 124, the voltage at junction 134 decays to about 10 volts which is less than the thyratron cathode potential, so any further positive signals on line 72 are clamped by diode 136 and consequently they cannot thereafter cause firing of thyratron 78. When switch 66 opens at the bottle rejection station, thyratron 78 ceases to conduct, and its anode voltage rises rapidly to approximately the B+ potential, producing a positive pulse 120 through condenser 90, which is used to trigger the rejection control as previously indicated. At the same time, condenser 124 discharges to its initial state through resistor 132 and diode 142, with the latter aiding in speeding the discharge.

If the signal at the thyratron grid in FIGURE 7 is negative or zero as may be the situation when a bottle is properly filled, the voltage at junction 134 moves to approximately +20 volts when switch 66 closes, but if the applied voltage from line 72 is less, the voltage seen by the thyratron grid is insufficient to fire the thyratron. Accordingly, after approximately one millisecond, the voltage at junction 134 decays and the thyratron grid can no longer swing to more than about +5 volts. If the cathode bias is set at approximately 15 volts the grid is biased to —10 volts for example, and the thyratron cannot fire even though the inspected bottle moves past the gauging point and the voltage on line 72 moves to a large positive value. Consequently, since the thyratron has not fired under these conditions, the reopening of switch 66 does not cause a rejection pulse 120 on line 122.

On the other hand, if a bottle being inspected by the FIGURE 7 circuitry is sensed by the photocell to be underfilled or empty, the resultant large positive signal on line 72 is sufficient during the time that the voltage at junction 134 is above approximately +10 volts to cause thyratron 78 to fire. The resultant negative pulse to line 122, due to the discharging of condenser 90, is clamped to ground by diode 100 but then when switch 66 later reopens to turn off thyratron 78, the consequent recharging of container 90 provides for the rejection pulse 120.

As previously indicated, the preferred embodiment of this invention is illustrated in FIGURE 8. In this circuit the operation voltage for the bridge circuitry is obtained from an A.C. source through transformer 144 the output of which is rectified by rectifier 146 and filtered by condenser 148 in conjunction with resistor 150, to apply a D.C. voltage, of aproximately 150 volts for example, across the bridge circuit. In this embodiment the arm of potentiometer 152 is connected to junction 134, instead of ground as in FIGURE 7. This allows the photocell bridge to be balanced when the cells are exposed to equal illumination and produces a +5 volts pulse for positively triggering thyratron 78 when the bridge is balanced. In addition, the potential at junction 134 is additionally determined by two potential dividing resistors 154 and 156, instead of the arrangement indicated in FIGURE 7. As a further modification, the grid resistor 94 in FIGURE 8 has no paralleling diode 100 as in the previous embodiments, so the negative-going pulse 158 is coupled by resistor 160 to the grid of tube 96, but without harm resulting, of course.

Operation of the circuitry in FIGURE 8 is as follows: When the switch 66 is open, capacitor 124 is charged to +5 volts with respect to point 155 due to the voltage divider formed by resistors 154 and 156. In this condition the grid of thyratron 78 cannot go to more than +5 volts as it will be clamped by the conduction of diode 136.

When a slack filled bottle is in the measure position and switch 66 closes, the voltage at point 138 rises sharply to +15 volts due to the current passed by resistor 140 through resistor 132. This increase in voltage is passed as a pulse through capacitor 124 to point 155 and raises the voltage at this point to +20 volts (15 v. + 5 v.). This allows the grid of thyratron 78 to be raised to +20 volts through the bridge circuit if the bridge output is zero or positive. As the grid of thyratron 78 is more positive than the cathode bias voltage developed across resistor 132, thyratron 78 will "fire." (Thyratron 78 is capable of going into conduction in microseconds, and after this will stay in conduction regardless of bias until the plate current is interrupted.)

Capacitor 124 will charge from the voltage at point 138 and point 155 will fall back to +5 v. When the bottle reaches the ejection position, switch 66 will open, breaking the plate current of thyratron 78. This will cause the plate voltage of thyratron 78 to rise sharply to the B+ supply voltage. This produces a positive pulse through capacitor 90 which is aplied to the grid of the relay control tube 96 which is normally biased to plate current cut-off condition. This causes conduction of tube 96, causing the reject relay 104 to pull in for a period of time dependent upon the time constant of the coupling network 90 and 94. Capacitor 124 now discharges through diode 142 and resistor 132 to its initial condition.

If the bottle being inspected is acceptable, the bridge will be unbalanced and a large negative voltage will be present at the output of the bridge. As this voltage is in series with the positive voltage developed at point 155 when the switch 66 closes, the positive voltage will be bucked out by the bridge voltage and thyratron 78 will not "fire." After approximately 1 millisecond (the time constant of capacitor 124 and resistor 156) the voltage at point 155 will fall to approximately +5 volts, thus preventing the grid from going to more than +5 volts. As the cathode is raised to 15 volts, thyratron 78 is negatively biased to 10 volts and will stay cut off even though the bottle moves out of the measuring position and causes the bridge to balance or produce a positive output. The bridge can only control thyratron 78 for approximately 1 millisecond and during this time the bottle will be in the correct measuring position. When the bottle reaches the rejection position and switch 66 is opened, there will be no pulse occurring at point 91 as thyratron 78 was not in conduction during the time switch 66 was closed. Therefore, tube 96 will stay cut off and no eject action will be taken.

As representative parameters to which limitation is not intended, the following values are given (K means 1000 ohms, M megohm):

| | | |
|---|---|---|
| Condensers 90 and 124 | mfd | 0.1 |
| Potentiometer 92 | K | 22 |
| Resistor 94 | K | 100 |
| Resistor 103 | K | 3.3 |
| Resistor 104 | K | 47 |
| Resistor 132 | K | 6.8 |
| Resistor 140 | K | 56 |
| Resistor 154 | K | 270 |
| Resistor 156 | K | 10 |
| Resistor 160 | M | 1 |
| Thyratron 78 | | 2D21 |
| Tube 96 | | 12AU7 |

Thus, it is apparent that there has been provided a device which will detect the position of a bottle so that inspection is performed only when the bottle is located generally between the photocells and their light sources. This prevents various spurious indications which are produced at other bottle positions because of light being reflected from the curvature of the bottle and being refracted by the liquid and the glass. Additionally, this invention has provided a system for delaying the operation of the botlte identifying or ejection device until a slack filled bottle has sufficiently cleared the inspection position. It is apparent that the apparatus described above is not dependent upon the delay, but upon the position of the bottle, and therefore is independent of conveyor speed. In fact, the conveyor may move intermittently at various speeds, and the apparatus will still perform properly nevertheless.

Experiments have indicated that it is possible to measure the final liquid level to ±¼ inch with the transducer type photocell arrangement of this invention. The light source can be collimated through narrow horizontal slots so that a very sharp light cutoff is achieved when the liquid level is below the minimum permissable. Particularly in applications where the liquid involved has the characteristics of producing excessive foam or the like, this invention is much more applicable than the capacitance type transducer described in my aforementioned patent. Additionally, the cost of a gauge made in accordance with this invention is less than a capacitance gauge, due to the fact that the transducer and circuitry herein are of a more simplified nature.

While the classifying apparatus of this invention has been illustrated and described in combination with means for identifying articles which have a given characteristic, such as a deficiency, by bodily ejecting same from a conveyor line, other well-known identification methods such as marking or spraying, may be used instead. It is therefore apparent that many other changes and modifications of this invention can be made without departing from the scope of the invention as set forth in the appended claims.

What is claimed is:

1. A circuit for operating an identifying device at a later time in response to a predetermined signal derived earlier at an inspection station if a given characteristic of a movable article being therein inspected is present, comprising:

a multistable state memory having an output for providing a signal to operate said device, means for sensing the position of said article and for causing said memory to be in a first state when the article is in an inspection position in said station and for causing the memory to change from a second state upon effective removal of the article from said station if the memory is then in said second state and not said first state for causing operation of said device, means for determining relative to each article when in said station the presence of said given characteristics and generating said predetermined signal at least when an article is in said inspection position if said characteristic is present, means for coupling the said determining and generating means to said memory for changing the memory from said first state to said second state upon occurrence of said predetermined signal, and means for electrically defining the effective duration of said inspection position and preventing a change in said memory from its said first to second state after the defined duration even if any said predetermined signal is then generated by said determining means while said article is still in said inspection station and being sensed by said sensing means.

2. A circuit as in claim 1 wherein the defining means includes switch means operable by an article to opposite operating conditions respectively at the effective entry and exit of the inspection position.

3. A circuit as in claim 1 wherein the defining means includes a timing circuit for determining the effective time duration of said inspection position.

4. A circuit as in claim 3 wherein said sensing means includes switch means operable by an article entering said inspection position for starting said timing circuit operating.

5. A circuit as in claim 4 wherein said timing circuit includes an RC circuit which has a variable voltage point that begins changing in voltage when the timing circuit is started as aforesaid, and means for clamping the output of said generating means to said variable voltage point to keep any said predetermined signal generated outside of the effective inspection time duration from being effective to change the memory from its said first to second state.

6. A circuit for operating a signalling device at a later time in response to a predetermined signal derived earlier at an inspection station if a given characteristic of a movable article being therein inspected is present, comprising:

circuit means, including a circuit having a controllable actuator with an on control element, for operating said signalling device when the actuator is turned off, means in said circuit means for completing said actuator circuit when said moving article is in said station and for disrupting said actuator circuit when the article has thereafter effectively moved out of said station to a predetermined position at which time said signalling device can be operated, means for sensing the said given characteristic of an article present in said station while said actuator circuit is completed as aforesaid to provide said predetermined signal to said control element to turn on said actuator if said charteristic is present, and means for selectively coupling said actuator control element to a predetermined potential to prevent turning on of said actuator even in the presence of said predetermined signal unless said article is in a predetermined sensing area in said station, the disruption of said actuator circuit as aforesaid being effective after said given characteristic has been sensed by said sensing means to turn off the actuator and operate said signalling device.

7. A system for use with a conveyor at inspection and rejection stations to inspect the fill level of containers and reject those that arrive at the inspection station filled, if at all, with liquid to less than a predetermined container height, the liquid and at least the upper end of said container per se being capable of passing predetermined radiant energy, said liquid having a charatecistic causing substantial prevention of passage of said energy through most of the said upper end of the container between the instant fill-level and the top of said container, said system comprising:

source means for directing the said radiant energy across said conveyor at the said inspection station at approximately said predetermined container height and also directly above at a second height which is less than the container height, first and second radiant energy detectors for receiving the said energy on the other side of said conveyor at said predetermined and second heights respectively, a bridge circuit including said detectors for providing on an output line a first output signal when a said container filled above said predetermined height passes between said source means and detectors and for providing thereon a second and different output signal when a said container filled below said predetermined heights passes therebetween, a thryratron having a grid, anode, and cathode, means for coupling said bridge circuit output line to said grid, means for releasably clamping said grid to a potential substantially below the potential of said cathode, means for priming said thyratron via its said anode and cathode, means coupled to said thyratron for sensing the presence of a container between said source and detection means and for first effecting release of, then reclamping by, said clamping means to cause any said second but not first signal on said bridge circuit output line during the clamping means release to fire said thyratron and for extinguishing said thyratron only when said container has sufficiently passed out of said inspection station and into said rejection station, ejecting means at said rejection station, and means effectively responsive to the extinguishing of said thyratron for operating the said ejecting means to remove from said conveyor each underfilled container which causes a said second signal on the bridge circuit output line during the clamp release time as aforesaid.

8. A system for use with a conveyor at inspection and rejection stations to inspect the fill-level of containers and reject those that arrive at the inspection station filled, if at all, with a certain substance to less than a predetermined container height, said substance and at least the upper part of said container per se being capable of passing predetermined radiant energy, said substance having a characteristic causing substantial prevention of passage of said energy through most of the said upper end of the container between the instant fill-level and the top of said container, said system comprising:

source means for directing the said radiant energy across said conveyor at the said inspection station at approximately said predetermined height and also directly thereabove at a second height which is less than the height of the container, first and second radiant energy detectors for receiving the said energy on the other side of the conveyor at said predetermined and second heights respectively, a bridge circuit including said detectors for providing on an output line a first output signal when a said container filled to a point between said predetermined and second heights passes between said source means and detectors and for providing thereon a second and different output signal when a said container filled below said predetermined height passes therebetween, a thyratron having a grid coupled to said bridge circuit output line, means for preventing said thyratron from firing even in the presence of sufficient signals on said output line after a predetermined time interval embracing the centering of a container on the directed radiant energy during which interval the thyratron can be fired by a said second signal if it then occurs but not by a said first signal, means responsive to container position and operative to prepare said thyratron to fire during said interval and for extinguishing said thyratron, if it has been so fired, after the container has sufficiently passed out of said inspection station and into said rejection station, ejecting means at said rejection station, and means effectively responsive to the extinguishing of said thyratron for operating the said ejecting means to remove from said conveyor each container which causes a said second signal on the bridge circuit output line during said predetermined time.

9. A system as in claim 8 wherein said preventing means includes a container-operated switch coupled between said bridge output line and a below-firing potential.

10. A system as in claim 8 including an anode-cathode energizing circuit for said thyratron, wherein said thyratron fire preparation and extinguishing means includes a container-operated switch connected in the anode-cathode circuit.

11. A system as in claim 10 wherein the said preventing means includes means for clamping said grid to a below-firing potential except during said predetermined time which starts with the closure of said switch, there being a timing circuit including a condenser for determining the instant potential to which said grid is clamped and for determining said predetermined time.

12. A system as in claim 11 wherein said clamping means includes a diode coupled to said condenser, there being means including a part of said timing circuit for charging said condenser while said switch is open, and means including a part of said timing circuit for discharging said condenser when a container closes said switch.

13. A system as in claim 10 wherein said preventing means includes in said anode-cathode circuit a condenser in parallel with said switch and includes between said grid and condenser a diode back biased by the voltage across said condenser.

14. A system as in claim 10 wherein said preventing means includes a container-operated switch coupled between said bridge output and a below-firing potential.

15. A circuit as in claim 6 wherein the said selectively coupling means includes switch means normally connecting said actuator control element to said predetermined potential and operated by said article in said predetermined sensing area to release said potential from control element.

16. A circuit as in claim 6 wherein the said actuator circuit completing and disrupting means operates to complete the actuator circuit in response to movement of the said article into said station.

17. A circuit as in claim 16 wherein said controllable actuator is a thyratron having a grid as said control element and having an anode-cathode circuit which is closed and opened respectively by said circuit completing and disrupting means respectively for preparing the thyratron to fire upon receipt of said predetermined signal if said grid is decoupled from said predetermined potential and for extinguishing the thyratron under the condition aforesaid.

18. A circuit for operating a signalling device at a later time in response to a predetermined signal derived earlier at an inspection station if a given characteristic of a movable article being therein inspected is present, comprising:

circuit means, including a circuit having a controllable actuator with an on control element, for operating said signalling device when the actuator is turned off, means in said circuit means for completing said actuator circuit when said moving article is in said station and for disrupting said actuator circuit when the article has thereafter effectively moved out of said station to a predetermined position at which time said signalling device can be operated, means for sensing the said given characteristic of an article present in said station while said actuator circuit is completed as aforesaid to provide said predetermined signal to said control element to turn on said actuator if said characteristic is present, and means for coupling said actuator control element to a voltage above a predetermined potential when said actuator circuit is completed and thereafter for only a predetermined time interval to allow said actuator to be turned on only during said interval, said interval being during the time said article is in a predetermined sensing area in said station so as to prevent actuator response to a said predetermined signal generated by said sensing means after said interval while the article moves out of said station.

19. A circuit as in claim 18 wherein said coupling means includes a diode back biased by said voltage.

20. A circuit as in claim 18 including an electrical timing circuit for determining said time interval.

21. A circuit as in claim 18 including means for developing the aforesaid voltage as a variable voltage which at the instant of completion of said actuator circuit is maximum and which after said time interval is at a value below said predetermined potential and means for clamping the said control element to said variable voltage to keep any said predetermined signal generated after said time interval from being effective to turn on said actuator.

22. A circuit as in claim 21 wherein said actuator circuit completing and disrupting means includes a switch operated to open and closed positions by said article, said variable voltage means includes a condenser and resistor means for determining said time interval and being connected to said switch, and said clamping means includes a diode connected between said condenser and actuator control element and back biased by the said variable voltage.

23. A circuit as in claim 22 wherein said condenser and switch are in parallel and the condenser is charged to said maximum voltage before closure of the switch to complete the actuator circuit.

24. A circuit as in claim 22 wherein said condenser and switch are in series and the condenser is charged to a voltage below said predetermined potential before closure of said switch to complete the actuator circuit, said closure being effective to jump the condenser voltage above said predetermined potential.

(References on following page)

References Cited by the Examiner

UNITED STATES PATENTS

| | | | |
|---|---|---|---|
| 2,415,167 | 2/1947 | Gieseke | 250—210 |
| 2,416,595 | 2/1947 | Reynolds | 250—223 |
| 2,732,503 | 1/1956 | Jacobs | 250—223 X |
| 2,781,477 | 2/1957 | Jenner | 209—111.6 X |
| 2,793,746 | 5/1957 | Meyer | 209—111.5 |
| 2,843,756 | 7/1958 | Wise | 250—210 |
| 2,916,633 | 12/1959 | Stone | 250—223 |
| 2,945,588 | 7/1960 | Fenn | 209—111.5 |
| 2,982,404 | 5/1961 | Harmon | 209—111.5 X |
| 3,003,631 | 10/1961 | Stock | 209—111.5 X |
| 3,031,077 | 4/1962 | Mumma et al. | 209—111.6 |
| 3,038,606 | 6/1962 | Leaver | 209—111.5 |
| 3,084,797 | 4/1963 | Niles | 209—111.7 X |
| 3,089,594 | 5/1963 | Early | 209—111.7 |
| 3,094,213 | 6/1963 | Wyman | 209—111.7 |

FOREIGN PATENTS 239,906  8/1962  Australia.

M. HENSON WOOD, JR., *Primary Examiner.*

ROBERT B. REEVES, *Examiner.*